No. 635,813. Patented Oct. 31, 1899.
F. SCHULMEISTER.
FLY TRAP.
(Application filed Aug. 15, 1899.)
(No Model.)
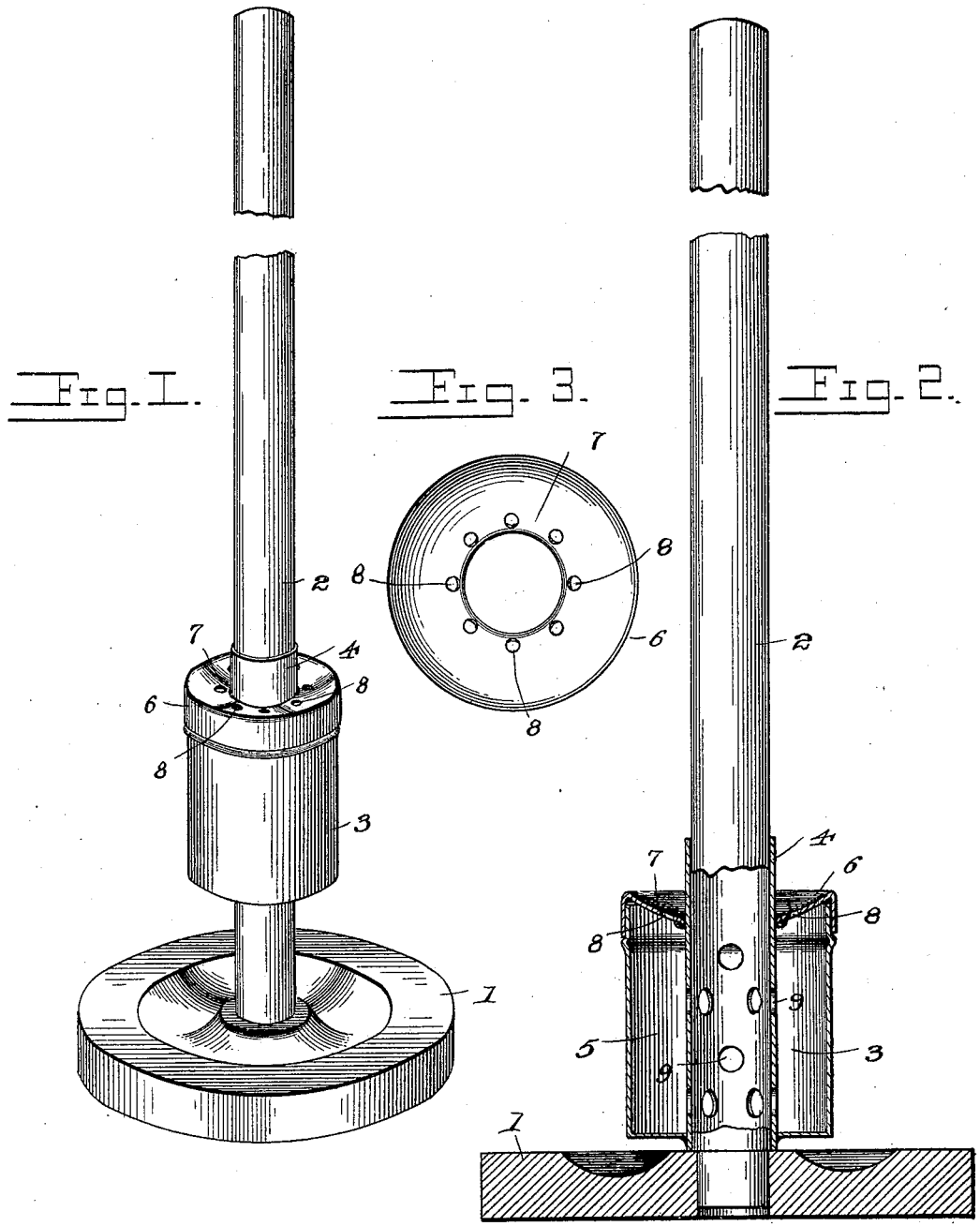
Witnesses
F. E. Alden.
Louis G. Julihn
Fritz Schulmeister, Inventor.
By his Attorneys,
C. A. Snow & Co.
THE NORRIS PETERS CO., PHOTO-LITHO., WASHINGTON, D. C.

UNITED STATES PATENT OFFICE.

FRITZ SCHULMEISTER, OF ST. LOUIS, MISSOURI.

FLY-TRAP.

SPECIFICATION forming part of Letters Patent No. 635,813, dated October 31, 1899.

Application filed August 15, 1899. Serial No. 727,307. (No model.)

*To all whom it may concern:*

Be it known that I, FRITZ SCHULMEISTER, a citizen of the United States, residing at St. Louis, in the State of Missouri, have invented a new and useful Fly-Trap, of which the following is a specification.

My invention relates to improvements in fly-traps; and its object is the production of an improved trap in which the flies are attracted to and retained by an adhesive substance.

The invention consists in the provision of a simple and inexpensive device for preparing the adhesive surface and for quickly removing the attached flies therefrom to restore the normal condition of the trap and the continuation of its usefulness.

Referring to the drawings, Figure 1 is a perspective view of my trap complete. Fig. 2 is a sectional view thereof, partly in elevation; and Fig. 3 is a top plan view of the traveler.

Referring to the numerals of reference on the drawings, 1 indicates a base of any suitable size and shape, but preferably of ornamental form, from which springs a standard 2, which in practice constitutes the surface to which the flies are designed to adhere.

3 indicates what I will term a "traveler," comprising a transversely-perforated tube or sleeve 4, slidably mounted upon the standard 2 and surrounded by a receptacle or reservoir 5, designed to contain in liquid or viscous form the adhesive substance to be applied to the standard-tube.

6 indicates a cover for the reservoir, provided with a depressed head 7, having a number of small openings 8 therein and a central aperture for the reception of the tube or sleeve 4, which extends therethrough and to a considerable distance beyond the upper edge of the reservoir.

In practice the reservoir 5 having been filled with the adhesive or sticky substance, preferably sweetened to attract the flies, the traveler, comprising the tube or sleeve and receptacle, is reciprocated upon the standard, the adhesive substance passing from the reservoir through the openings 9 in the sleeve 4 and coating the standard. The traveler is then permitted to drop to the base, and the trap is ready for use. As soon as a sufficient number of flies have adhered to the standard the traveler is elevated, and the flies detached by the upper edge of the sleeve are deposited in the pan formed by the depressed head of the reservoir. Any quantity in excess of that capable of being retained in the head is provided for by an annular channel or depression 10, formed in the base immediately below the edge of the reservoir.

What I claim is—

1. In a fly-trap, the combination with a standard, of a receptacle comprising an outer imperforate shell, an inner perforated tube extending above the outer shell and adapted to scrape the standard, and a depressed cover for the receptacle located below the upper end of the tube and adapted to receive the scrapings, said cover having perforations adjacent the tube and opening into the receptacle.

2. In a fly-trap, the combination with a standard, of a receptacle comprising an outer imperforate shell, an interior perforated tube extending above the outer shell, and a depressed cover for the receptacle located below the upper end of the tube.

In testimony that I claim the foregoing as my own I have hereto affixed my signature in the presence of two witnesses.

FRITZ SCHULMEISTER.

Witnesses:
 FRED C. WEBER,
 ULRICH HARDER.